United States Patent [19]

Ramel

[11] Patent Number: 5,815,497
[45] Date of Patent: Sep. 29, 1998

[54] METHOD OF TRANSMISSION BY PACKETS BETWEEN A PLURALITY OF TRANSMITTERS AND AT LEAST ONE RECEIVER AND TRANSMITTER AND RECEIVER IMPLEMENTING THIS METHOD

[75] Inventor: Louis Ramel, Aunay-sous-Auneau, France

[73] Assignee: Thomson-CSF, Paris, France

[21] Appl. No.: 568,555

[22] Filed: Dec. 7, 1995

Related U.S. Application Data

[63] Continuation of Ser. No. 352,029, Nov. 30, 1994, abandoned.

[30] Foreign Application Priority Data

Nov. 30, 1993 [FR] France .................................. 93 14309

[51] Int. Cl.⁶ ................................ H04J 1/00; H04J 13/02
[52] U.S. Cl. ......................... 370/342; 370/343; 370/480; 370/201; 370/204
[58] Field of Search ............................. 370/18, 19, 69.1, 370/120, 121, 342, 320, 321, 335, 441, 465, 471, 473, 474, 479, 480, 482, 343; 375/201, 202, 204, 205, 200

[56] References Cited

U.S. PATENT DOCUMENTS

| | | | |
|---|---|---|---|
| 4,688,251 | 8/1987 | Citron et al. ............................. | 375/201 |
| 5,008,899 | 4/1991 | Yamamoto ............................... | 375/201 |
| 5,022,046 | 6/1991 | Morrow, Jr. ............................... | 370/18 |
| 5,309,474 | 5/1994 | Gilhousen et al. ....................... | 370/18 |
| 5,359,624 | 10/1994 | Lee et al. ................................ | 375/205 |
| 5,394,391 | 2/1995 | Chen et al. .............................. | 370/18 |

FOREIGN PATENT DOCUMENTS 0 486 834 A1  5/1992  European Pat. Off. .

OTHER PUBLICATIONS

Proceedings of the 24th Annual Allerton Conference on Communication, Control and Computing; Oct. 1–3, 1986, Monticello, Illinois, US. pp. 540–549.

Mohsen Soroushnejad, et al., "Collision Resolution Algorithms for Networks with Spread–Spectrum Capture Capability"; sponsored by The Coordinated Science Laboratory and the Department of Electrical and Computer Engineering of the University of Illinois at Urbana–Champaign.

Proceedings IEEE Infocom '86; Fifth Annual Conference, "Computers and Communications Integration Design, Analysis, Management"; Technical Sessions: Apr. 8–10, 1986, Miami, Florida, US. Yitzhak Birk, et al., Code–Assignment Policies for Multi–Receiver Nodes in CDMA Packet Radio Networks pp. 415–423.

Electronics Letters; vol. 28, No. 22, Oct. 22, 1992 J.C. Walker, et al., "Network of 12 Optical Sensors Using Code–Division Multiplexing" pp. 2074–2075.

*Primary Examiner*—Min Jung
*Attorney, Agent, or Firm*—Oblon, Spivak, McClelland, Maier & Neustadt, P.C.

[57] ABSTRACT

The disclosure relates to the transmission of data by packets on carrier frequencies with spreading and de-spreading of the data elements. In order to reduce the risks of overlapping among packets sent out by different transmitters, each packet to be transmitted is designed according to the characteristics of frequency spreading and/or code spreading of a common standard packet, constituted by successive segments all orthogonal to one another, the first segment comprising a header designed for identification. At reception the header, when it is found, activates the processing of the corresponding packet with de-spreading as a function of the characteristics of the spreading of the standard packet as they are known to the transmitter.

1 Claim, 3 Drawing Sheets

METHOD OF TRANSMISSION BY PACKETS BETWEEN A PLURALITY OF TRANSMITTERS AND AT LEAST ONE RECEIVER AND TRANSMITTER AND RECEIVER IMPLEMENTING THIS METHOD

This application is a Continuation of application Ser. No. 08/352,029, filed on Nov. 30, 1994, now abandoned.

BACKGROUND OF THE INVENTION

The present invention relates to the transmission of data by packets on carrier frequencies, with data spreading and de-spreading, between several transmitters and at least one receiver.

When several transmitters have to send packets to one or more receivers, either by RF links or by the use of wired links at least some of which may convey packets that do not come from a single transmitter, there is a risk of overlapping, namely a risk of having two packets which, at least for a part of their respective periods of time, simultaneously reach a receiver and, because they have similar characteristics, cannot be separated from each other. Such an overlapping, which may be complete or less than complete, is generally called a collision or interference between packets.

To reduce the risks of collision, different techniques are known. These techniques consist in making the packets mutually orthogonal, namely in giving them characteristics, at transmission, that are sufficiently different from one transmitter to another for the packets to be capable of being separated at reception. Thus, there is a known way of making the different transmitters all transmit on different carrier frequencies. This technique is called frequency division multiple access or FDMA. The implementation of this technique is not always possible for reasons related to the available bandwidth of frequencies, or even for reasons related to the cost price of the receivers. There also is a known way of transmitting the packets by spreading codes that are different from one transmitter to another. This technique is called code division multiple access or CDMA. Another way of reducing the risk of collisions is to make a transmission in time division multiple access mode or TDMA with the different transmitters. The TDMA mode requires the transmitters and the receiver or receivers to work all in synchronism and is therefore not convenient for use. These three techniques may furthermore be combined to make the packets orthogonal to one another.

Prior to reception from several transmitters, a receiver must know the characteristics, called spreading characteristics, proper to each of the transmitters, namely the characteristics that correspond to the carrier frequencies and to the codes used in each transmitter and to the time intervals allocated to each transmitter. The result thereof is that to have adequate orthogonality between the packets and a high bit rate of the packets, the implementation protocols, both at transmission and at reception of the packets, are complex.

The present invention is aimed at avoiding or at least at reducing the above-mentioned drawbacks.

This is obtained especially by the use of packets which all have the same spreading but a spreading that varies as a function of the position in the packet.

SUMMARY OF THE INVENTION

According to the present invention there is provided a method of transmission by data packets on carrier frequencies, with the spreading and de-spreading of the data, between n transmitters, where n is an integer greater than 1, and at least one receiver, the packets possibly having different durations, these durations having, at the most, a given value, this method consisting in considering a standard packet with a duration at least equal to the given value, this standard packet being formed by a sequence of data segments that succeed one another starting from a preliminary segment whose beginning is the same as the beginning of the standard packet, each segment having a corresponding given spreading and de-spreading, and the spreadings of two segments, whatever may be these segments, being orthogonal, said method consisting in giving any transmitted packet, irrespectively of its duration, a spreading identical to the spreading of a standard packet truncated by the same duration, namely the standard packet limited to the duration of the transmitted packet considered, this duration of the truncated standard packet being measured from the beginning of the standard packet, and consisting, at reception, in having the spreadings of the standard packet in memory, identifying the transmitted packets by monitoring the reception of the preliminary segments alone, the transmitted packet identified by its received preliminary segment being then de-spread as a function of the spreadings of the segments constituting this transmitted packet.

According to the present invention there is further provided a transmitter for the implementation of the method according to the invention, comprising control means having in memory the spreading characteristics of a standard packet in order to control the preparation of the spreading of any packet to be transmitted according to the spreading characteristics of the standard packet.

According to the present invention there is further provided a receiver for the implementation of the method according to the invention that comprises monitoring means to identify segments having specific characteristics, called preliminary segments, and to activate a process for the de-spreading of a received packet when a segment having the specific characteristics is identified and control means having, in memory, the spreading characteristics of a standard packet in order to control the de-spreading of any packet received by the transmitter as a function of the spreading characteristics of the standard packet.

BRIEF DESCRIPTION OF THE DRAWINGS

The present invention shall be understood more clearly and other characteristics will appear from the following description and from the figures pertaining thereto of which.

MORE DETAILED DESCRIPTION

Figure 1:
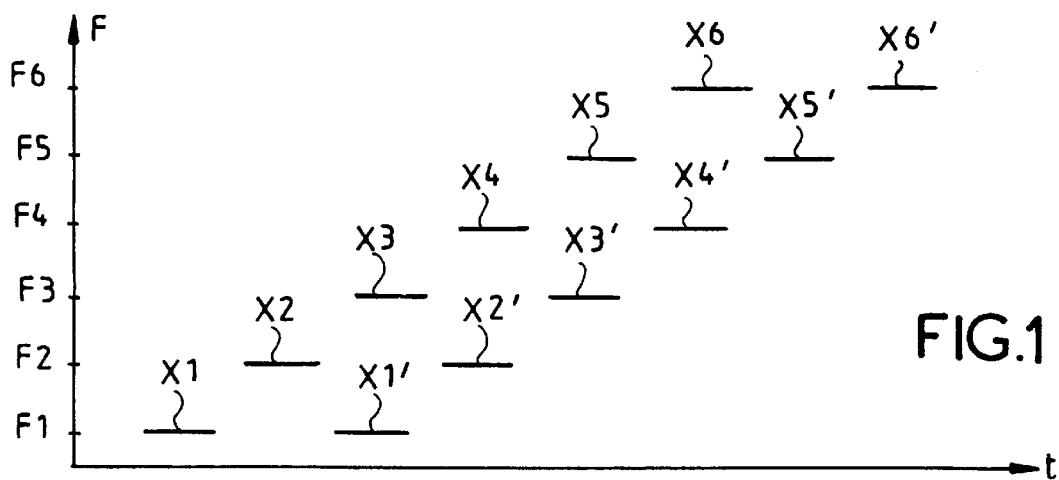
FIGS. 1 to 3 show diagrams designed to illustrate packet transmissions by the method according to the invention, FIGS. 4 and 5 respectively show the diagrams of a transmitter and a receiver for the implementation of the method according to the invention.

To make it easier to understand the method of transmission of packets on carrier frequencies with spreading/de-spreading of the data, which shall be referred to here below, reference shall be made to the notion of a standard packet and of sequences of segments. The standard packet is considered in the course of transmission and its duration is at least equal to the duration of the biggest packet to be transmitted. Furthermore, this standard packet is formed by a sequence of data segments wherein each segment has its own spreading. The spreadings of two segments, whatever they may be, are always orthogonal to each other.

According to the method, any packet transmitted has a spreading identical to that of the truncated standard packet constituted by that part of the standard packet which, being measured from the starting point of the standard packet, has a duration equal to the duration of the transmitted packet considered. Naturally, should the packet transmitted have a duration equal to that of the standard packet, the truncated standard packet is constituted by the standard packet itself.

Again, according to the invention, any first segment of a sequence has, at least, a header formed by a synchronization field whose composition is the same irrespectively of the packet and irrespectively of the transmitter that produces the packet, at least during a process of transmission between several transmitters and one or more receivers. It is possible that this first segment, hereinafter called a preliminary segment, will have only the header or will have also, following the header, the address or addresses of the addressee or addressees of the packet, or other information elements for the processing of the packet at reception. Thus, the spreading of the preliminary segment of any transmitted packet being known, irrespectively of the transmitter station, a receiver station will identify the arrival of the packet by having to monitor only the arrival of the preliminary segments. When such a identifying takes place, it is enough for the receiver station to get synchronized in a standard way with the header of the preliminary segment identified to take account of the spreadings of a packet, match its reception characteristics to these spreadings in order to successively receive all the segments of the sequence of segments forming the packet. Naturally, the risks of collision remain but they are considerably reduced since, taking the case where all the segments of the sequence have the same duration, there can be no collision between two packets if there has been no collision between their preliminary segments.

It follows from the above that the shorter the segments, the smaller will be the risks of collision and that, unless considerations of cost price or of ease of operation dictate a limit not to be exceeded in terms of lower values, it will be the quantity of information to be placed in the preliminary segment and hence the duration of this preliminary segment that will determine the risks of collision.

Figure 2:
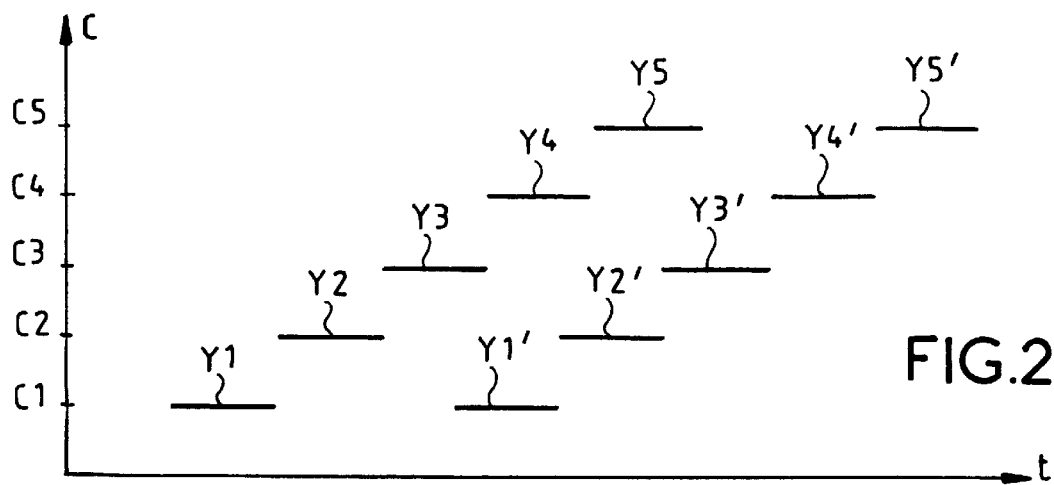
Figure 3:
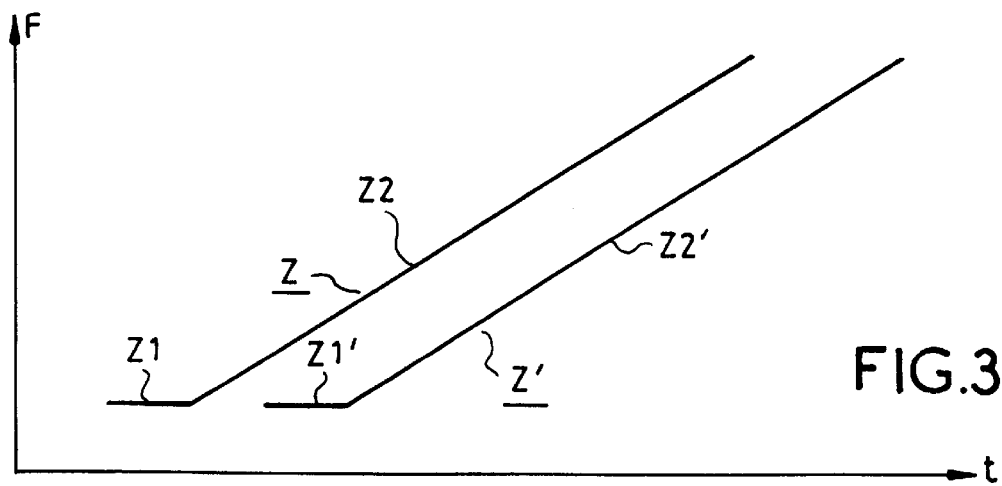

Some examples of packets fulfilling the conditions referred to here above are described by means of FIGS. 1 to 3 which are diagrams representing the spreading of packets as a function of time. In these diagrams, the packets are represented by lines.

In the case of FIG. 1, the orthogonal character is obtained by frequency hopping, F1 to F6, and the diagram shows two packets formed respectively by segments X1 to X6 and X140 to X640 . In this example, the segments all have the same duration and are not contiguous in time. It is also possible, in the case of frequency hops, to have segments of various sizes in one and the same packet and/or contiguous segments. In the case of FIG. 1, there would be collision between the two packets if and only if their respective preliminary segments X1, X140 overlap at least partially in time. Since this is not at all so for X1, X140 , a transmitter that identifies the preliminary segment X1 pertaining to the first of the two packets gets synchronized on X1 and then modifies its reception characteristics in order to successively receive the segments X2, X3, X4, X5 and X6 and when the preliminary segment X140 of the second packet arrives, it is not identified since the receiver has not finished receiving the first packet and is then in a state of reception on the carrier frequency F3 while the preliminary segment X140 is sent out on the carrier frequency F1.

In the case of FIG. 2, the orthogonality between the segments is obtained by spreading codes C1 to C5 which are all orthogonal to one another, and what has been stated with respect to the frequencies in the case of FIG. 1 can be transposed to the codes in the case of FIG. 2. FIG. 2 shows two packets respectively formed by the segments Y1 to Y5 and Y1' to Y5' and it must be noted that, in the example shown, the segments of one and the same packet both have the same length and are contiguous in time. Naturally, this is not obligatory and the use of disjointed segments or segments having different durations is possible, especially for the preliminary segment which, for example, may have a duration greater than that of the other segments of the packet.

FIG. 3 relates to another method of limiting interference between the packets which is similar to the one shown in FIG. 1 but replaces the frequency hops by a frequency ramp for the segments other than the preliminary segment. In this case, and to remain within the same conditions of operation as with the two foregoing cases, the preliminary segments Z1, Z1', which comprise information elements to identify the packet, are formed by several bits all transmitted on one and the same carrier frequency. Thus, as also in the two foregoing cases, the receiver does not have to carry out a frequency scan when it does not receive a packet and when, therefore, it monitors the arrival of packets by identifying, for this purpose, their preliminary segments.

In FIG. 3, the parts of the two packets Z, Z' which are transmitted by frequency ramp have been identified by the symbols Z2 and Z2'. The transmission of Z2 and Z2' corresponds to the transmission according to FIG. 1 with segments that are all limited to one bit and to a frequency of transmission of the segment equal to the mean frequency of the carrier during the transmission of the segment considered. It must be noted that, for a packet, the preliminary segments Z1, Z1' and the ramp part Z2, Z2' are, in the example described, contiguous in time and contiguous in terms of frequencies. Here again, this is not obligatory, and a time interval could separate the preliminary segment from the ramp part and/or the ramp part could begin at a frequency that is different from the transmission carrier frequency of the preliminary segment. It is also possible to make transmissions by using not a ramp with a frequency variation that is linear in time but a ramp with a non-linear variation or several successive distinct ramps with linear or non-linear variation that may or may not be contiguous in time and in frequency.

To improve the orthogonality between the packets and between the segments of one and the same packet, it is possible, for example in the case of FIG. 1, to associate a spreading code with each of the frequency levels by choosing spreading codes that are mutually orthogonal, at least for two successive segments whatever these may be. Similarly, in the case of FIG. 3, it is possible to subdivide the oblique part, such as Z2, Z2', and to associate a spreading code with each subdivision by choosing mutually orthogonal codes, at least for two successive subdivisions, whatever these may be.

Figure 4:
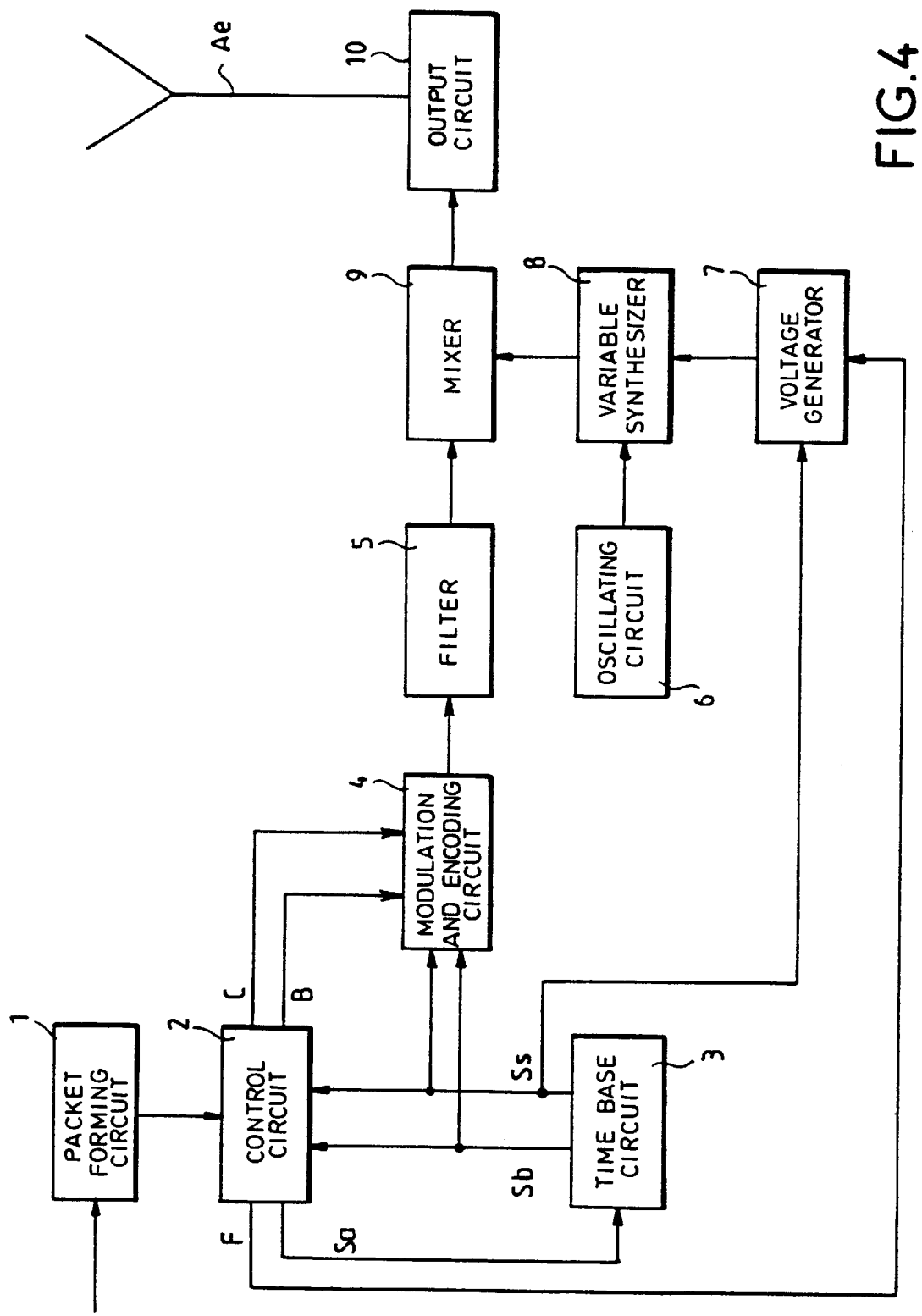
Figure 5:
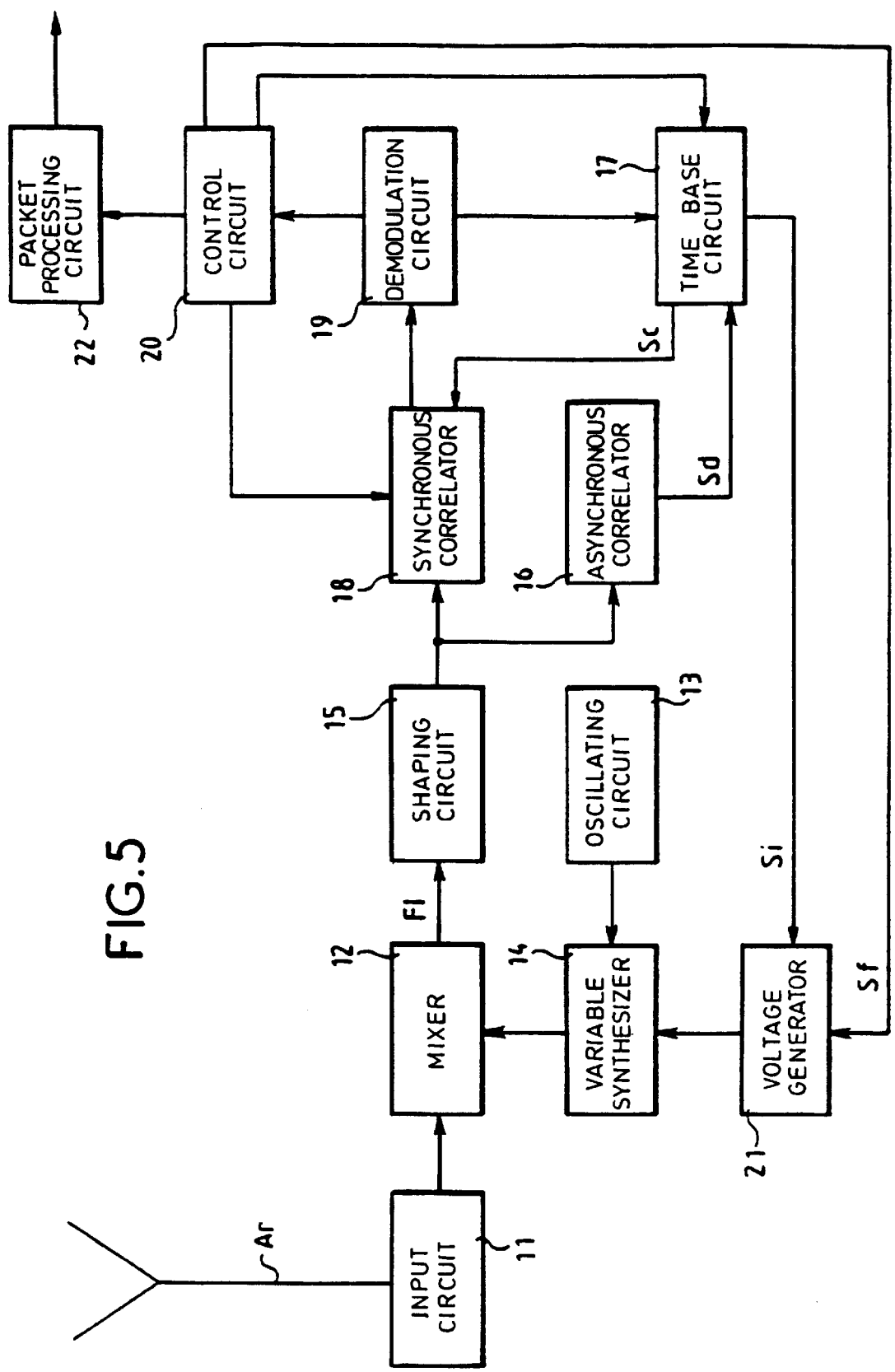

If The exemplary embodiments of a transmitter and a receiver that shall be described by means of FIGS. 4 and 5 pertain to equipment for the implementation of the method. This equipment enables the use of the changes in frequency and of the spreading codes during the transmission of a packet. Since the originality of the method does not reside in the well-known fact of making the packets orthogonal but lies, especially as seen further above, in the transmission of packets all having the same structure and in the way in which they are identified, the transmitter according to FIG. 4 and the receiver according to FIG. 5 are very close to known transmitters and receivers from which they are distinguished above all by their operating protocols as described here above. In fact, with these protocols being known, the making of a transmitter and a receiver capable of applying them raises no problem for those skilled in the art who, on the contrary, will find a certain degree of facility therein. It has therefore been possible, in the description here below, to eliminate all that pertains to current technology and does not contribute to an understanding of the exemplary modes of implementation of the method. The drawings are thereby clearer and the explanation is thereby simplified.

FIG. 4 is an electrical diagram pertaining to a transmitter for the implementation of the method. First of all, this diagram shall be commented upon in the case where the transmitter works with frequency hops and with spreading codes. Then, an indication shall be given of how the commentary could be modified for the case where the transmitter works in frequency ramp mode.

The data bits to be transmitted, D, are given to a packet-forming circuit 1 which, as a function of the bits that it receives, delivers packets to a control circuit 2. The role of the circuit 2 is to introduce information elements into the packet. These information elements may, according to need, be for example the address of the sender or the address of the addressee(s). Its role is also to organize the operations for spreading the packets by spreading codes and by frequency hops. A time base circuit 3 provides the synchronization circuits needed for these spreading operations. This circuit 3 is activated by a signal Sa given by the circuit 2 whenever it needs to start the operations for spreading a packet.

To organize the spreading operations, the control circuit 2 has available the list of frequencies and codes to be used as well as the laws of application of these frequencies and codes, i.e. it has, in memory, the characteristics of the standard packet referred to here above. It may thus organize the operations so that, as seen further above, the spreading characteristics of the packet that shall be transmitted correspond to those of the truncated standard packet having the same duration.

From the time base circuit 3, the control circuit 3 receives pulses Sb for the synchronization of the bits and pulses Ss for the synchronization of the starting points of segments. It may thus give groups of bits B each corresponding to the bits of a segment to be transmitted and, with each group, a signal C and a signal F respectively representing the spreading code and the frequency to be used for the transmission of the group considered.

A modulation and encoding circuit 4 receives the signals B, C and the synchronization signals Sb, Ss. It gives a modulated signal formed by segments to which the determined encodings are applied by the control circuit 2. After filtering in a filter 5, these segments, to which orthogonal spreading codes are applied, reach the first input of a mixer 9 which, at a second input, receives a signal at a carrier frequency whose value is determined, for each segment, by the signal F corresponding to the signal considered. The signal at a carrier frequency relating to the segment that arrives at the first input of the mixer 9 is prepared by a variable synthesizer 8 receiving a signal at a fixed frequency given by an oscillating circuit 6 and a control signal to control its output frequency given by a voltage given by a voltage generator 7. To give this voltage, the generator 7, which is synchronized by the signals Ss for the synchronization of the starting points of the segments, receives the signal F whose value indicates the voltage to be delivered by the generator 7 and hence the frequency to be delivered by the synthesizer 8.

The mixer 9, as a function of the signals that it receives at its two inputs, therefore delivers packets at its output, these packets being formed by segments encoded according to mutually orthogonal encodings, these segments, for one and the same packet, all having different frequencies.

An output circuit 10 having a wideband filter at input and a power amplifier at output receives the signal prepared by the mixer 9 and, at an antenna Ae, gives packets formed by a sequence of segments with frequency hopping between the segments and orthogonal encoding between all the segments of one and the same packet.

To receive a packet such as this, a receiver according to FIG. 5 is proposed. This receiver has a reception antenna Ar connected to an input circuit 11 comprising, in series, a preamplifier and a wideband filter. The circuit 11 is connected to the first input of a mixer 12 that receives the output signal of a variable synthesizer 14 at a second input. This synthesizer receives a signal at a fixed frequency from an oscillating circuit 13. The signal at an intermediate frequency delivered by the mixer 12 is shaped in a shaping circuit 15 that has a filter followed by an amplifier with automatic gain control.

By means of the synthesizer 14 whose operation shall be seen further below, the mixer 12 gives a signal with a constant intermediate frequency modulated by the information elements contained in the packets sent out by the transmitter according to FIG. 4. After passing into the circuit 15, this signal is applied to the input of two correlators 16, 18. The correlator 16 is an asynchronous correlator whose role is to make a search, in its input signal, for the headers which it has detected as headers that constitute fields of synchronization all having the same composition, whatever may be the packet.

When a header is found by the correlator 16, a packet-beginning signal Sd is delivered by the correlator 16 to a time base circuit 17 that gives a synchronization signal Sc to the synchronous correlator 18. The frequency of the signal Sc, when this signal is activated by the signal Sd, corresponds to the theoretical value of the intermediate frequency. The correlator 18 is connected to the input of a demodulation circuit 19 which is itself connected to the input of a control circuit 20 and the circuit 20 has an output connected to an input for the control of spreading codes of the synchronous correlator 18. The circuits 18, 19, 20 therefore form a loop.

The control circuit 20 is the counterpart of the control circuit 2 of the transmitter according to FIG. 4. Its main role is that of organizing the operations for the de-spreading of the packets received. For this purpose, it has available the list of frequencies and codes used as well as the laws of application of these frequencies and codes. When the asynchronous correlator 16 finds a header, it activates the synchronous correlator 18. Since the correlator 18 is initially set to carry out a de-spreading corresponding to the spreading code applied to that part of the packet which immediately follows the header, it can then immediately give a signal formed by de-spread bits. The modulation circuit 19 receives the signal and demodulates it to give it to the control circuit 20 which, as it knows the structure of the standard packet, is capable, as and when the bits arrive, of determining that segment of the packet to which a bit belongs and therefore the corresponding code and spreading frequency. Thus, the circuit 20 can control the synchronous correlator 18 so that the despreading code used at a given time in this correlator corresponds to the spreading code of the signal at its input connected to the output of the circuit 15.

The control circuit 20 can thus give de-spread packets to a packet processing circuit 22 and this circuit 22 delivers the information elements contained in the packets to the addressee user or users.

The demodulation circuit 19 is connected to an input of the time base circuit 17 to synchronize the circuit 17 with the bits obtained by demodulation in the circuit 19.

The control circuit 20 can also have the role of carrying out the reading, in the packet, of the information elements such as the address of the sender or the addressee of the packet in order, for example, to stop the a packet that is not addressed to the receiver from being taken into account. But, above all, the control circuit 20 plays a major role that has not yet been referred to, pertaining to the control of the variable synthesizer 14. Indeed, as and when it identifies a beginning of a segment, it gives the time base circuit 17 a pulse relating to the beginning of a segment so that the circuit 17 can prepare a signal Si for the synchronization of the beginning of a segment. The signal Si is sent to an authorization input of a voltage generator 21 whose output gives a control voltage for the control of the frequency of the variable synthesizer 14. The value of this control voltage is a function of the value of a signal Sf given to the generator 21 by the control circuit 20. The value of Sf is modified by the circuit 20 as and when the segments appear and by the choosing, from its list of frequencies, of that frequency which corresponds to the segment received at a given time. Thus controlled, the variable synthesizer 14 enables the mixer 12 to carry out the frequency de-spreading and, therefore, to give the signal at constant intermediate frequency applied to the input of the shaping circuit 15.

The implementation of the method using a frequency ramp, as illustrated in the diagram of FIG. 3, and with spreading codes results in a transmitter diagram which is also that of FIG. 4. However, the voltage generator 7 is controlled to deliver a voltage ramp and the signal C, given by the circuit 2 for the control of the encoding operations, is modified when the ramp goes through certain predetermined values known to the control circuit 2. And when the method is implemented with a frequency ramp but without spreading codes, the link that gives the signal C is eliminated in the diagram of the transmitter.

Similarly, the implementation of the method in reception with a frequency ramp and spreading codes leads to a diagram which is that of FIG. 5. However, the voltage generator 21 is controlled to deliver a voltage ramp and the signal given by the circuit 20 to the correlator 22 is modified when the ramp goes through the predetermined values known to the control circuit 20. And, when the method is implemented with a frequency ramp but without spreading codes the synchronous correlator is eliminated in the diagram according to FIG. 5 and the output signal of the shaping circuit 15 is applied, firstly, to the asynchronous correlator 16 and, secondly, directly to the demodulation circuit 19.

The invention is not limited to the examples described and relates, for example, to the case where the characteristics of the standard packet vary with time, either in a predetermined way or after the exchange of information elements between stations equipped with equipment for the implementation of the method.

What is claimed is:

1. A method of transmission by transmission data packets on carrier frequencies wherein said transmission occurs between a plurality of transmitters and at least one receiver and wherein said transmission data packets have different durations wherein values of said different durations do not exceed a predetermined value, the method comprising the steps of:

defining, as a model a standard packet having a duration value equal to said predetermined value, said standard packet being formed by a preliminary data segment followed by a remaining data segment wherein said remaining data segment is transmitted in one frequency ramp having a frequency variation which is a function of time;

defining truncated standard packets in the form of said standard packet including a corresponding preliminary data segment and remaining data segment but with a duration of the remaining data segment at the most equal to the duration of the remaining data segment of the standard packet;

forming said transmission data packets in the form of truncated standard packets;

receiving said transmission data packets by said at least one receiver; and identifying said transmission data packets in the form of said truncated standard packets by monitoring reception of corresponding ones of said preliminary segments of said transmission packets.

* * * * *